Figure 1:
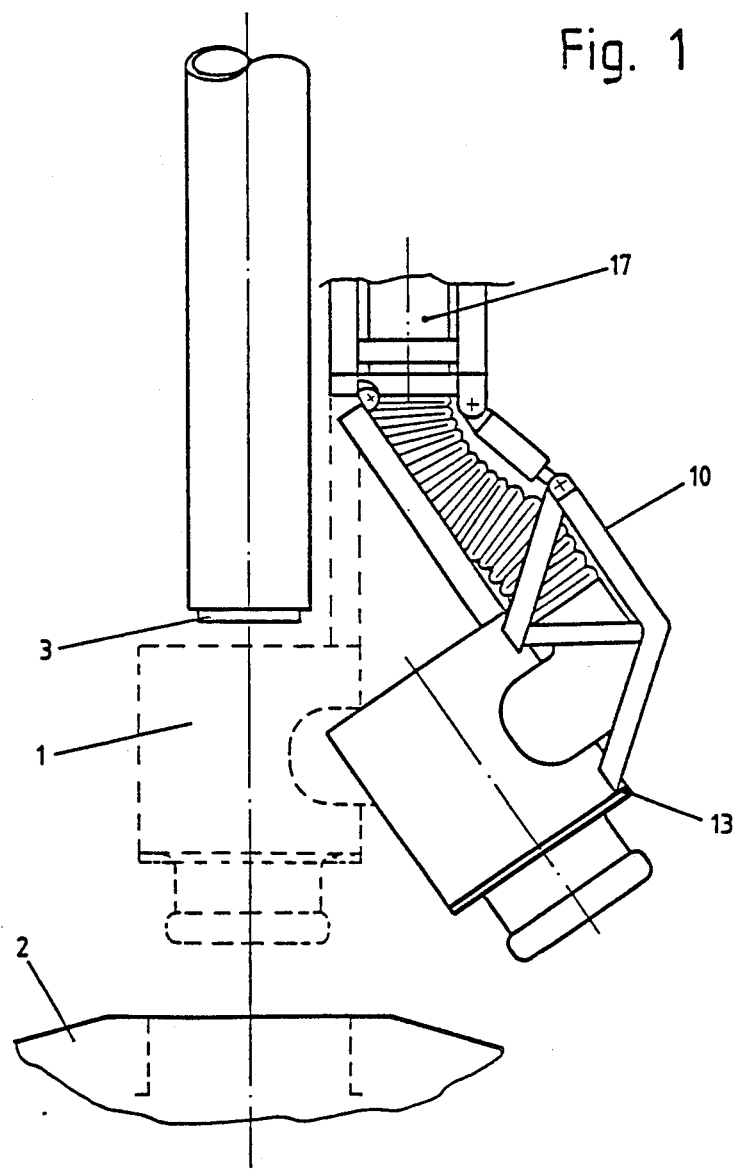

United States Patent [19]  [11] Patent Number: 4,809,864
Neuthard et al.  [45] Date of Patent: Mar. 7, 1989

[54] DEVICE FOR SEALING THE GAP BETWEEN A CONTAINER OPENING AND A RELATIVELY MOVABLE FILLER PIPE

[75] Inventors: Erich Neuthard, Hemsbach; Klaus-Albrecht Steinert, Rimbach, both of Fed. Rep. of Germany

[73] Assignee: Firma Carl Freudenberg, Weinheim, Fed. Rep. of Germany

[21] Appl. No.: 157,919

[22] Filed: Feb. 19, 1988

[30] Foreign Application Priority Data

May 6, 1987 [DE] Fed. Rep. of Germany ....... 3714982

[51] Int. Cl.4 .............................................. F17C 13/00
[52] U.S. Cl. ................... 220/86 R; 220/85 F; 220/85 VR; 220/232
[58] Field of Search ................... 220/86 R, 85 F, 232, 220/85 SP, 85 VR, 85 VS

[56] References Cited

U.S. PATENT DOCUMENTS

| 3,921,412 | 11/1975 | Heath et al. | 220/85 VR X |
| 4,690,172 | 9/1987 | Everett | 220/232 X |
| 4,696,330 | 9/1987 | Raudman et al. | 220/85 F X |
| 4,717,036 | 1/1988 | Dundas et al. | 220/85 F X |

FOREIGN PATENT DOCUMENTS 1365458 9/1974 United Kingdom .

Primary Examiner—Steven M. Pollard
Attorney, Agent, or Firm—Felfe & Lynch

[57] ABSTRACT

A device for sealing the gap between the opening of a tank and a filler pipe passing movably through the opening. It includes a coupling tube which can be placed in the gap and which can be sealed against the opening at one end and against the filler pipe at the other by radially inflatable gaskets. The inwardly facing second gasket is disposed at a distance above the opening and the first gasket, and the coupling tube has at least one secondary opening in the area between the first gasket and the second which serves for the connection of a vacuum line or a pressure line.

10 Claims, 5 Drawing Sheets

DEVICE FOR SEALING THE GAP BETWEEN A CONTAINER OPENING AND A RELATIVELY MOVABLE FILLER PIPE

The invention relates to a device for sealing the gap between the opening of a tank and a filler pipe movably penetrating the opening.

Such a device is disclosed in British Pat. No. 1,365,458. It serves for sealing off the charging opening of a ball mill and is permanently joined to the casing thereof. It is therefore complicated and difficult to use on different containers, especially transport containers.

The openings provided for the filing and unloading of transport containers can differ considerably one from the other as regards their shape and size. The leak-proof connection of the filler tubes is extremely problematical for this reason alone. It is further complicated by the fact that at least part of the openings available are not provided with screw threads or other connecting means, and are subject to changes of position relative to the filler tube during the loading operation. On account of the varying stress this is regularly the case with spring-mounted tanks on trucks, railway cars or ships.

When tanks are being filled, a need furthermore exists for continuously removing the air from the headspace while the filling operation is being performed. The problem arises that this air is usually contaminated by components of the cargo and therefore cannot be permitted to escape without being decontaminated. Aspiration of that air is therefore desirable, but cannot be in a practical manner with the means presently available.

The invention relates to a device for the problem-free filling of tanks, which will provide a good seal for the gap between the filler pipe and the tank opening and a good relative freedom of movement between the two, while permitting the aspiration or the injection of secondary substances during the tank filling operation.

According to the invention, a device for sealing the gap between the opening of a tank and a filler pipe movably penetrating the opening includes annular sealing means fastened to a coupling tube and spaced on the coupling tube as a first, outwardly facing gasket and a second, inwardly facing gasket, the second gasket being disposed at a distance above the opening and the first gasket, and the coupling tube surrounding an inner chamber which is accessible from without in the area between the first and the second gaskets of at least one secondary opening which passes transversely through the wall of the coupling tube.

In a device according to the invention, the annular sealing means is separated by the coupling tube in the radial direction into two individual gaskets, which makes it possible to compensate for differences in size and shape between the opening of the tank and the filler pipe. At the same time an excellent freedom of relative movement between the two is achieved, relating both to relative displacements in the axial and radial direction and to tilting movements. Such tilting can occur, for example, in the loading of boats, in which the tank compartments disposed in tandem from bow to stern are filled successively.

The device according to the invention has at least one secondary opening laterally penetrating the wall of the coupling tube, through which the headspace now present or still present in the tank is accessible during the filling operation. It is desirable to provide the secondary opening with a connection for the attachment of an aspirating or injection conduit. Thus, a pressure or depression can be produced to accelerate the loading operation itself, and also permits the harmless removal of vapors or dusts.

On the inside of the coupling tube an additional, third gasket can be provided, which can be urged against the filler pipe. The use of a shut-off valve in the secondary opening to cut off the connection between the secondary opening and the headspace can in this case be dispensed with.

According to another embodiment, at least one of the gaskets is provided on the side remote from the coupling tube with at least one circumferential sealing lip. The achievement of a good seal between each gasket and the adjacent part, namely the filler pipe on the one hand and the tank opening on the other, is thereby facilitated. It is desirable for a great number of such sealing lips to be used, and to be disposed at a slight distance apart axially, and together to form a kind of labyrinth seal with the confronting surface.

The gaskets consist of a very high-grade flexible material to make it possible to conform to slight irregularities in the surface to which they are applied. Elastic films can be used in making them, such as rubber films, which permit the reduction of volume necessary for the assembly of the individual parts by simply letting the pressure out of the inner chamber. Inelastic flexible materials, such as fabric reinforced rubber films, have better mechanical strength. The volume reduction necessary for the assembly of the parts of the device according to the invention can in this case require the application of a vacuum to the inner chamber and thus a certain greater complexity in making the device ready for operation. By treating the surface with PTFE (polytetrafluoroethylene) or similar substances to reduce friction the relative freedom of movement of the sealed surfaces can be further improved.

The rapid deployment of the device according to the invention may require the filler pipe and the coupling tube to be introduced very rapidly into the opening of the tank or removed very rapidly therefrom. To prevent damage to the gaskets in this case it has proven to be advantageous to enable them to be retracted in the uninflated state into annular recesses in the coupling tube. The stresses in this case will affect only the coupling tube, which is made of a metal and accordingly can withstand them.

For the achievement of a sufficiently precise interrelationship, especially between the first gasket and the opening of the tank, it has proven to be advantageous to provide the coupling tube with a seating means whereby it can be supported on the top surface around the opening.

Such seating means can be constituted by an integral flange on the coupling tube and eliminates any special adjustments during the introduction of the coupling tube into the opening. The coupling tube can be held by an articulation which makes it possible to swing it to one side and disengage it after the filler pipe is taken out. This makes it possible to place a different coupling tube with undamaged gaskets into operation if a gasket on the first coupling tube has been damaged. The possibility furthermore exists of engaging a coupling tube of a different diameter in case a tank with an opening of extremely different diameter has to be filled. In these cases, too, no appreciable interruption of operation is involved in this respect.

As a rule it is sufficient, in the case of the device according to the invention, for the gaskets to be inflatable and/or evacuable together. The use of configurations in which the gaskets can be inflated and/or evacuated independently of one another may be recommendable in special circumstances.

The important advantage of the device according to the invention is that it permits and absolutely hermetic connection between the filler pipes and the openings of tanks which is easy to make and quickly released, while it is possible to apply a pressure or a depression to the headspace still present or already present in the tanks during the filling operation. It is possible in this manner to accelerate the filling operation and at the same time to prevent pollution of the environment. It is easily possible to retrofit existing filling apparatus with the device according to the invention, and it can be done on the basis of a modular scheme.

In accordance with the invention, a device for sealing the gap between the opening of a tank and a filler pipe movably penetrating the opening comprises an inflatable annular seal which can be brought into the gap and pressed by injection of a pressurized medium against the surfaces radially defining the gap. The device also includes a coupling tube. The annular seal is fastened to the coupling tube and is divided with respect to the latter into an outwardly pointing, first gasket and an inwardly pointing second gasket. The second gasket is disposed at a distance above the opening and the first gasket, and the coupling tube is penetrated in the area between the first and second gaskets by at least one secondary opening.

For a better understanding of the invention, together with other and further objects thereof, reference is made to the following description, taken in connection with the accompanying drawings, and its scope will be pointed out in the appended claims.

Figure 2:
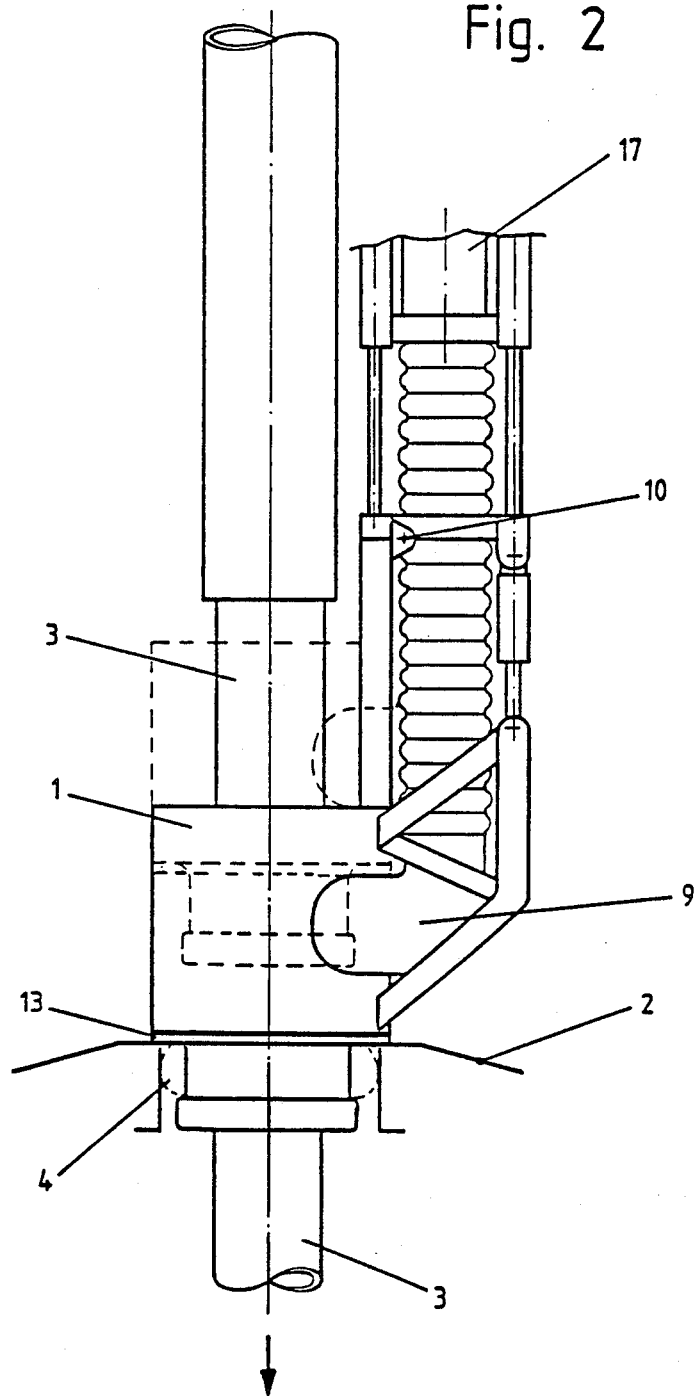
Figure 3:
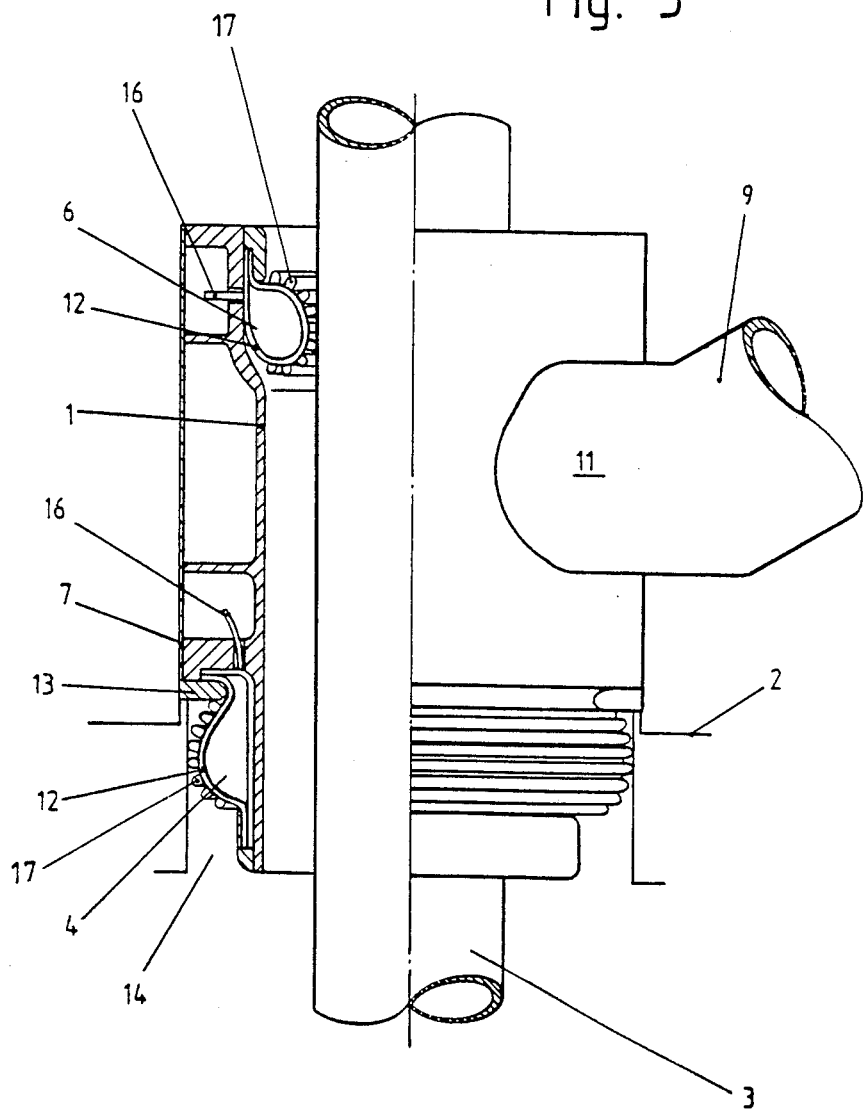
Figure 4:
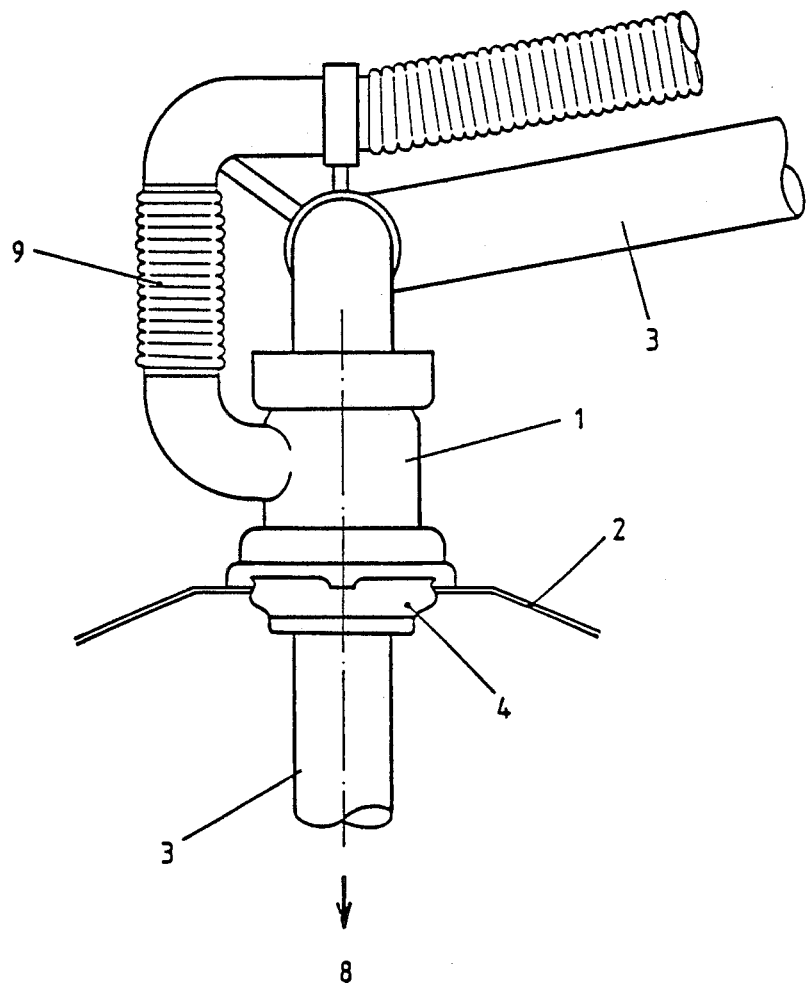
Figure 5:
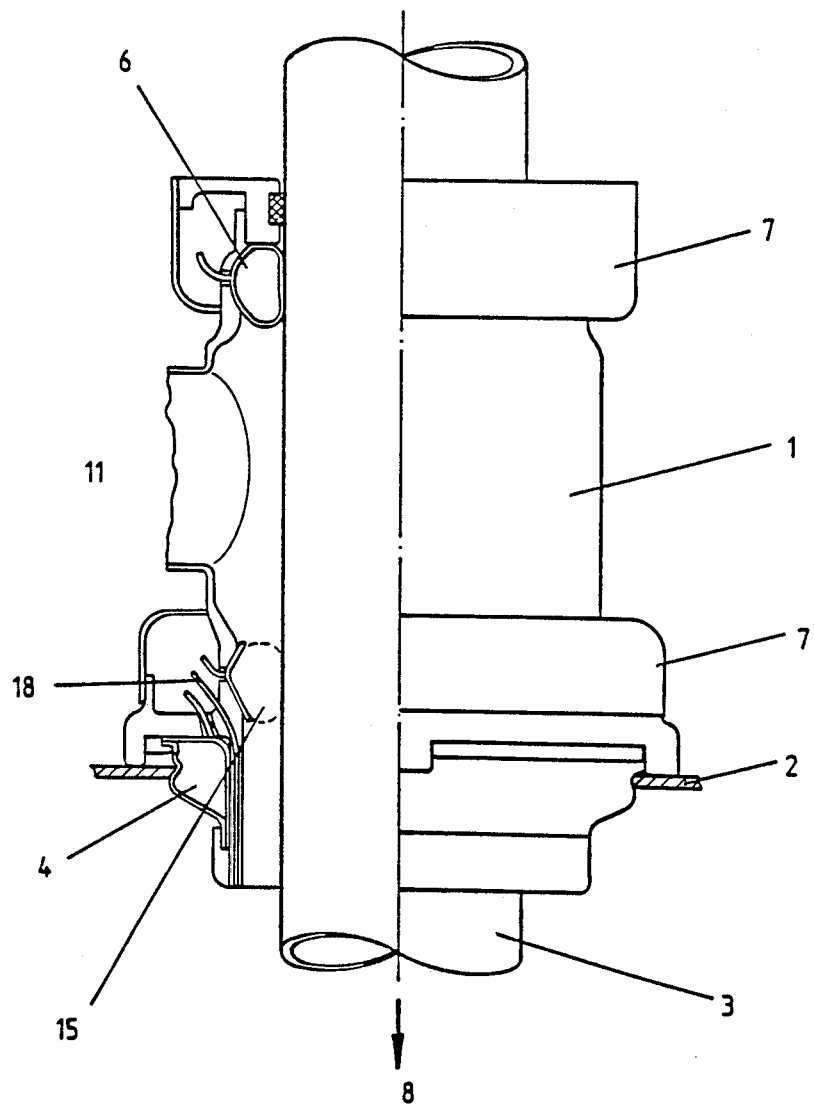

Referring now to the drawings:

FIGS. 1 to 3 are diagrammatic views showing the use of the device according to the invention at a tank car loading station; and FIGS. 4 and 5 are diagrammatic views showing the use of the device according to the invention at a tank truck loading station.

Referring now more particularly to FIG. 1, the tank 2 of the tank car is indicated diagrammatically. It contains at its top an opening into which the filler pipe 3 can be inserted perpendicularly and is usually lowered to the bottom. The filler pipe 3 is suspended in the customary fashion from a swivel arm which simultaneously serves as the supporting frame for the device according to the invention. This device is pivoted on the supporting frame such that it can be swung completely away from the guide of the delivery tube 3. This facilitates replacement in the event of damage. FIG. 2 shows the device according to FIG. 1 under normal conditions of operation. The coupling tube 1 is provided at the bottom with a seating surface 13 and is lowered toward the opening of the tank 2 such that the seating surface 13 rests on the surface surrounding the top of the opening. Between the first gasket 4 and the surface internally defining the opening there is thus an easily acceptable mutual association.

To prepare for operation, the delivery tube 3 is then passed through the coupling tube and lowered all the way to the bottom of the tank 2 which is to be filled or emptied.

The first and the second gaskets 4 and 6 are then inflated with a medium under pressure, preferably compressed air. They thus apply themselves hermetically to the inside wall of the opening and to the surface of the filler pipe 3. The details can be seen in FIG. 3.

The first and the second gasket 4, 6 are each disposed in an annular recess in the coupling tube 1. These gaskets are thus well protected against damage when in the uninflated state.

The first gasket and the second gasket 4, 6 preferably each comprise a fabric-reinforced rubber material which is characterized by an excellent flexibility enabling it to compensate in an excellent manner for any movements of the tank 2 relative to the filler pipe 3.

The connecting lines 16 serve for the production of pressure or depression in the two gaskets 4 and 6. They enable the first and second gaskets 4 and 6 to be collapsed against the wall of the coupling tube as necessary for the insertion of the latter into the opening and the insertion of the delivery tube 3 into the coupling tube 1.

The wall of the coupling tube 1 is interrupted laterally between the first and second gasket 4 and 6 by the auxiliary opening 11 which is connected by the connecting tube 9 to the exhaust line 17. During the filling operation, vapors present in the headspace remaining in the tank 2 can be aspirated through the exhaust line and carried to a cleaning device not represented.

On the other hand, when the device is being used for unloading tanks, it is also possible, if desired, to feed a fluid under pressure through the connection 9 above the headspace in the tank, thereby enabling the unloading operation to be accelerated.

FIG. 4 shows an embodiment of the device according to the invention in functional combination with a tank truck filling device. The filler pipe 3 serves in this case simultaneously for the mechanical support of the coupling tube 1. Details on this subject can be seen from the fragmentary representation in FIG. 5. The design and arrangement of the first and second gasket 4 and 6 and the seating surface 13 are the same as in the preceding embodiments. A third gasket 15 is present in this case, which makes it possible to seal off by inflation the flow connection between the still available headspace in the tank 2 and the auxiliary opening 11 of the coupling tube 1. The line 18 is a control line serving to detect the level that has been reached by the liquid cargo.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A device for sealing the gap between the opening of a tank and a filler pipe movably penetrating the opening, comprising:

an inflatable annular seal which can be brought into the gap and pressed by injection of a pressurized medium against the surfaces radially defining the gap;

a coupling tube;

said annular seal being fastened to said coupling tube and being divided with respect to the latter into an outwardly pointing first gasket and an inwardly pointing second gasket, said second gasket being disposed at a distance above the opening and said first gasket, and said coupling tube being penetrated in the area between said first and the second gaskets by at least one secondary opening.

2. A device according to claim 1, which includes a third gasket provided internally on said coupling tube and below said secondary opening and pressable against the filler pipe.

3. Device according to claim 2, in which said gaskets are inflatable and evacuable independently of one another.

4. Device according to claim 2, in which said gaskets comprise a fabric-reinforced rubber film.

5. A device according to claim 1, in which at least one of said gaskets has on the side facing away from the coupling tube at least one circumferential sealing lip.

6. A device according to claim 5, in which said coupling tube has an annular recess and in which at least one of said gaskets can be sunken in an uninflated state in said annular recess in said coupling tube.

7. A device according to claim 1, in which said coupling tube includes seating means for seating said coupling tube on a seat surface surrounding the upper side of the opening between the tank and the filler pipe.

8. A device according to claim 7, in which said coupling tube has an integral annular projection forming said seating means.

9. A device according to claim 1, which includes a pivot bearing and in which said coupling tube is journaled in said pivot bearing and after removal of the filler pipe can be swung laterally outward.

10. A device according to claim 1, which includes a connection piece for a vacuum or pressure line for the secondary opening.

* * * * *